IMPEDANCE-MATCHING NETWORK

Filed May 22, 1958

INVENTOR
R. W. DE MONTE
BY
Ralph P. Holcomb
ATTORNEY

United States Patent Office 2,957,944

Patented Oct. 25, 1960

2,957,944

IMPEDANCE-MATCHING NETWORK

Robert W. De Monte, Glen Ridge, N.J., assignor to Bell Telephone Laboratories, Incorporated, New York, N.Y., a corporation of New York Filed May 22, 1958, Ser. No. 737,161

7 Claims. (Cl. 178—45)

This invention relates to wave transmission and more particularly to an impedance-matching network for building out the impedance of an inductively loaded line.

An object of the invention is to transform the impedance of an inductively loaded transmission line to a more desirable characteristic. Another object is to reduce reflection effects between such a line and apparatus connected thereto. A more specific object is to build out the impedance of such a loaded line, terminated in any fraction of a section, to an approximately constant resistance over a wide frequency band extending both above and below the cut-off of the line.

It is known that the impedance-frequency characteristic of an inductively loaded transmission line terminated in a fractional section is not very uniform, especially at low frequencies and near the cut-off. When such a line is connected to an amplifier whose transmission band extends above the cut-off of the line, the output impedance of the amplifier must match the impedance of the line over substantially the entire band of the amplifier or reflection effects may cause singing. In accordance with the present invention, this matching is facilitated by interposing an impedance-matching network between the amplifier and the line. The output impedance of the amplifier is generally of the type represented by a resistor, or by a resistor in series with a capacitor. The network is adapted to build out the impedance of the line to match that of the amplifier over the band of the amplifier.

In its simplest form, an impedance-matching network in accordance with the invention is adapted to build out an inductively loaded line terminated at full section, and comprises only a series impedance branch. This branch includes a series inductor shunted by the series combination of a resistor and a capacitor. The values of these elements are related to the inductance and the capacitance per section of the line for maximum smoothing with minimum loss. For other than full section, a shunt building-out capacitor is added on the line side. If required, a shunt impedance branch may be added, on either side of the series branch, for low-frequency correction. Also, a series resistor may be added on the drop side to step up the built-out impedance, or on the line side to improve the characteristic.

The nature of the invention and its various objects, features, and advantages will appear more fully in the following detailed description of the typical embodiments illustrated in the accompanying drawings, of which Fig. 1 is a diagrammatic circuit showing how an impedance-matching network may be associated with an inductively loaded transmission line;

Figure 1:
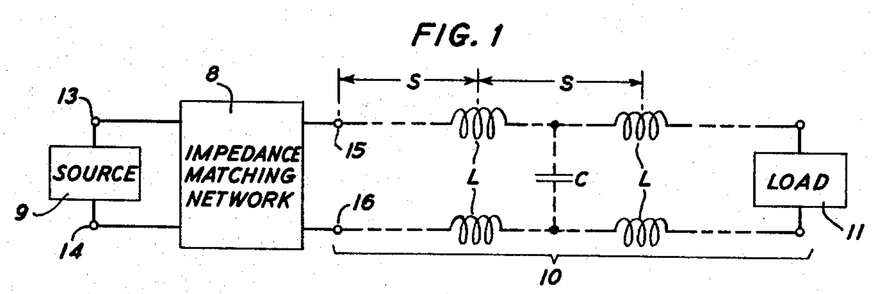

In Fig. 1, an impedance-matching network 8 is interposed between a signal source 9 and a transmission line or cable 10 terminated in a matching load impedance 11. The line 10 is periodically loaded with inductors of value L having a spacing S. Each inductor L is divided into two equal windings, with one in each side of the balanced line. Each section of line of length S has distributed capacitance C. The source 9 may, for example, but an amplifier, which may be of the negative-impedance type.

Figure 2:
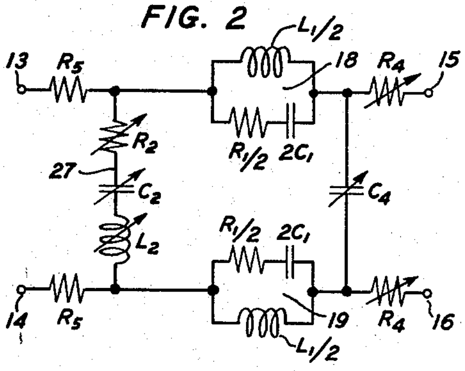
Figs. 2 and 3 are schematic circuits of alternative networks in accordance with the invention.
Figure 3:
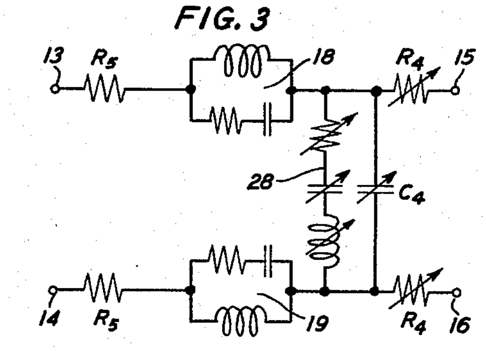

Figs. 2 and 3 show schematically two embodiments of the network 8 in accordance with the invention. The terminals 13, 14, 15 and 16 correspond to the similarly numbered terminals in Fig. 1. Each network comprises two equal series impedance branches 18 and 19, one in each side. Each of these branches includes an inductor of value $L_1/2$ in parallel with the series combination of a resistor of value $R_1/2$ and a capacitor of value $2C_1$. If an unbalanced structure is permissible, the branch 19 may be omitted and the impedance of each of the elements in the branch 18 doubled.

Figure 4:
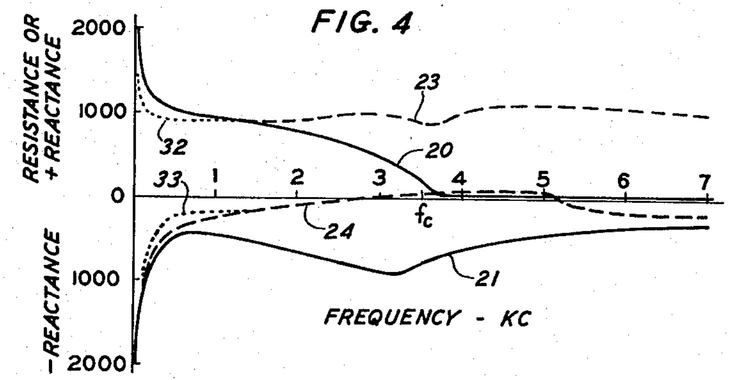
Fig. 4 shows comparative impedance-frequency characteristics of a line alone and built-out lines.

Fig. 4 shows a typical image impedance characteristic of the line 10 when terminated in a full section. In this example, the conductors are 22-gauge copper wire, S is 6000 feet, L is 0.088 henry, and C is 0.0936 microfarad. The solid-line curves 20 and 21 represent, respectively, the resistance and the reactance of the line in ohms, plotted against the frequency in kilocycles per second. Each of these curves has a high value at low frequencies. The resistance falls rapidly to 1000 ohms at about 0.7 kilocycle and then more gradually to under 100 ohms near 3.5 kilocycles, which is the cut-off frequency designated $f_c$, and remains at approximately this value. The reactance also falls rapidly to about 400 ohms at 0.7 kilocycle, rises to about 900 ohms at $f_c$, and then gradually falls off. If the source 9 is an amplifier, a good match with the line 10 must be obtained over the entire band of the amplifier to prevent reflections which may cause singing. It is assumed that the amplifier band extends well above the cut-off of the line, to $2f_c$ or higher.

In order to facilitate this matching, the component elements of the network 8 are proportioned with respect to L and C to build out the impedance of the line 10, when terminated at full section, to more nearly a constant resistance over the band of the amplifier 9. Full-section termination is chosen because a network which is satisfactory for building out such a line may be readily adapted for use with a line having any fractional termination simply by adding a shunt capacitor, as explained below.

It is seen from the curve 20 that, in order to get a constant resistance from, say, 0.5 to 7 kilocycles, it is necessary to add a resistance which gradually increases from a low value at low frequency to about 1000 ohms at a little above $f_c$ and then continues at this value at higher frequencies. It is also seen from the curve 21 that, if it is desired to annul the negative reactance over this range, a positive reactance with a broad peak in the neighborhood of $f_c$ must be added.

The series impedance branches 18 and 19 are best suited for providing this type of impedance characteristic. The values of $L_1$, $C_1$, and $R_1$ may be computed directly from the line constants L and C. However, there are two conflicting criteria. One is that the insertion loss of the network 8 should be kept low near $f_c$. The other is that the resistance of the built-out line should be as constant as possible. The best compromise is found when the elements have approximately the following values:

$$L_1=0.37L \quad (1)$$

$$C_1=0.58C \quad (2)$$

$$R_1=0.68\sqrt{L/C} \quad (3)$$

Thus, in the present example, the elements have the values $$L_1=0.37\times 0.088=0.325 \text{ henry} \quad (4)$$

$$C_1=0.58\times 0.0936=0.0542 \text{ microfarad} \quad (5)$$

$$R_1=0.68\sqrt{0.088/0.0936\times 10^{-6}}=645 \text{ ohms} \quad (6)$$

It is to be understood that any or all of these elements may vary somewhat from the optimum values given and still provide a characteristic which is acceptable in some cases. This variation may sometimes be as much as 15 percent in either direction.

Figure 5:
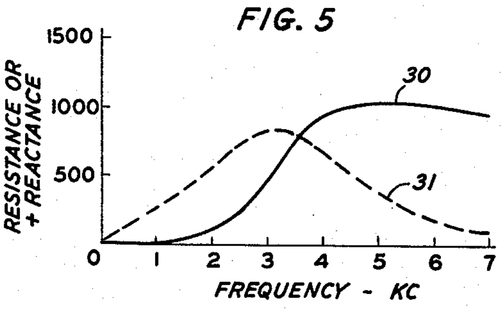
Fig. 5 shows the resistance and reactance of one embodiment of the impedance-matching network in accordance with the invention.

In Fig. 5, the curve 30 shows the resistance and the curve 31 the reactance of an impedance branch in which $L_1$, $C_1$, and $R_1$ have the values given in (4), (5) and (6). The broken-line curves 23 and 24 of Fig. 4 show the built-out resistance and reactance, respectively, obtained when a network 8 constituted only by this series branch is connected in tandem with the line 10. It is seen that the resistance is quite constant between 0.5 and 7 kilocycles, and the reactance has been greatly reduced.

Figure 6:
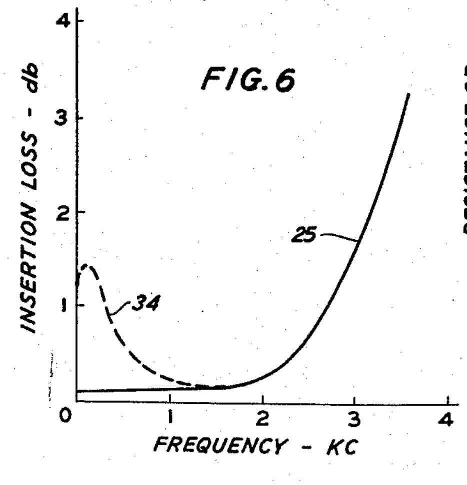
Fig. 6 shows typical insertion loss characteristics of one of the networks.

The insertion loss of the network 8 as thus constituted, given by the solid-line curve 25 in Fig. 6, is less than two decibels below three kilocycles. As a matter of comparison, the loss in a section of line of the type assumed in the example is between a half and one decibel in this range.

If the network 8 is to be used with a line terminated in a fractional section X, the shunt capacitor $C_4$ is added at the line end. This capacitor builds out the line to full section and has the value $$C_4=C(1-X) \quad (7)$$

If X is small, say less than 0.2, the built-out impedance may be improved by adding two series resistors each of value $R_4$ on the line side. Their function is to compensate for the resistance not furnished by the missing portion of the line section, and each has the value $$R_4=r(1-X)/2 \quad (8)$$

where $r$ is the direct-current resistance of the conductors of a full section of line of length S. In an unbalanced network, one of the resistors $R_4$ may be omitted and the value of the remaining one doubled. For convenience, $C_4$ and $R_4$ may be made adjustable, as indicated by the arrows.

The resistive component 23 may be flattened somewhat at frequencies below one kilocycle by the addition of a low-frequency corrector. In Fig. 2, this takes the form of a shunt branch 27 on the drop side of the series branches 18 and 19. If the source 9 has a reactive component, this branch may also be used to shape the reactive component 21 to give a better match. The branch 27 comprises a resistor of value $R_2$, a capacitor of value $C_2$, and an inductor of value $L_2$ connected in series. $L_2$ and $C_2$ resonate at a low frequency $f_r$, generally below 0.3 kilocycle. The value of $R_2$ is chosen to provide the required damping. In the present example, it is assumed that the source 9 is a negative-impedance repeater whose output impedance may be represented by a resistance of 900 ohms in series with a capacitance of two microfarads. The frequency $f_r$ is chosen as 0.203 kilocycle. The elements have the following values:

$$L_2=1.08 \text{ henries} \quad (9)$$

$$C_2=0.50 \text{ microfarad} \quad (10)$$

$$R_2=3400 \text{ ohms} \quad (11)$$

When the branch 27 is added, the built-out resistance and reactance are as shown in Fig. 4 by the dotted curves 32 and 33, respectively. Shortly above one kilocycle, the curves merge with the curves 23 and 24, respectively. As shown by the broken-line curve 34 in Fig. 6, the loss of the network 8 is increased somewhat, especially below one kilocycle, by the addition of the shunt branch 27.

If the impedance of the source 9 is a pure resistance of 900 ohms, $L_2$ may be decreased to, say 0.84 henry and $R_2$ to, say, 1800 ohms.

The capacitor $C_2$ is included to make the impedance of the shunt branch 27 sufficiently high to permit good transmission of low-frequency dial pulsing and supervisory signals through the network 8. If this type of signaling is not present on the line 10, $C_2$ may be omitted, making the built-out impedance of the line more nearly a constant, pure resistance down to a frequency of 0.01 kilocycle or lower.

Substantially the same low-frequency correction may be obtained with a similar shunt branch 28 on the line side of the branches 18 and 19, as shown in Fig. 3. For best results, the values of the resistor, capacitor, and inductor may have to be modified slightly from the values given above for $R_2$, $C_2$, and $L_2$.

The elements $R_2$, $C_2$, and $L_2$ may be made adjustable, as indicated, for convenience.

If a built-out impedance with a resistance higher than that shown by the curve 23 is desired, the equal series resistors $R_5$ and $R_5$ may be added on the drop side as shown in Figs. 2 and 3.

It is to be understood that the above-described arrangements are only illustrative of the application of the principles of the invention. Numerous other arrangements may be devised by those skilled in the art without departing from the spirit and scope of the invention.

What is claimed is:

1. In combination, a wave transmission line and an impedance-matching network connected to one end thereof, the line being periodically loaded with an inductance L per section and having distributed shunt capacitance C per section, and the network comprising series impedance equivalent to a branch including an inductance $L_1$ in parallel with the series combination of a capacitance $C_1$ and a resistance $R_1$, where $L_1$, $C_1$, and $R_1$ have approximately the values 0.37L, 0.58C, and $0.68\sqrt{L/C}$, respectively.

2. An impedance-matching network for a loaded transmission line terminated at full section, the line having series inductance L and shunt capacitance C per loading section and the network comprising series impedance equivalent to a branch including an inductor of value $L_1$ in parallel with the series combination of a capacitor of value $C_1$ and a resistor of value $R_1$ in which $L_1$, $C_1$, and $R_1$ have approximately the values 0.37L, 0.58C, and $0.68\sqrt{L/C}$, respectively.

3. In combination, an inductively loaded transmission line terminated at one end in less than a full section and an impedance-matching network connected to the one end thereof, the line including uniformly spaced loading inductors each of value L and having distributed shunt capacitance C per section, the network comprising a series impedance branch and a shunt capacitor of value $C_4$ at the junction of the network and the line, the series branch including an inductor in parallel with the series combination of a capacitor and a resistor, the values of the inductor, capacitor, and resistor in the series branch being proportioned with respect to L, C, and $\sqrt{L/C}$, respectively, to build out the impedance of the line terminated at full section to an approximately constant resistance over a wide band of frequencies extending both above and below the cut-off of the line and $C_4$ being approximately equal to the difference between C and the distributed shunt capacitance of the terminal section of the line at the one end thereof.

4. In combination, an inductively loaded transmission line and an impedance-matching network connected to one end thereof, the line having series inductance L per section and shunt capacitance C per section and being terminated at the one end in a fractional section X, the network including a series impedance branch, a series resistor of value $R_4$ connected between the series branch and the line, and a capacitor of value $C_4$ connected in shunt at the junction of the series branch and the series resistor, the series branch including an inductor in parallel with the series combination of a capacitor and a resistor, the values of the inductor, capacitor, and resistor in the series branch being proportioned with respect to L, C, and $\sqrt{L/C}$, respectively, to build out the impedance of the line terminated at full section to an approximately constant resistance over a wide band of frequencies extending both above and below the cut-off of the line, $C_4$ being approximately equal to $C(1-X)$, and $R_4$ being approximately equal to the direct-current resistance of a section of line of length $(1-X)$.

5. In combination, a signal source, an inductively loaded transmission line, and an interposed impedance-matching network comprising a series impedance branch, the branch including an inductor shunted by the series combination of a resistor and a capacitor, the values of the inductor, capacitor, and resistor being proportioned with respect to the inductance L per section of line, the capacitance C per section of the line, and $\sqrt{L/C}$, respectively, to build out the impedance of the line terminated full section to an approximately constant resistance over a wide frequency band extending both above and below the cut-off of the line, and the network including another resistor connected in series between the series branch and the source to raise the built-out impedance to a value more nearly matching the impedance of the source.

6. In combination, an inductively loaded transmission line and an impedance-matching network connected to one end thereof, the line having series inductance L per section, shunt capacitance C per section, and a cut-off frequency $f_c$, the network including a series impedance branch and a shunt impedance branch, the series branch including an inductor in parallel with the series combination of a capacitor and a resistor, the shunt branch comprising a resistor, a capacitor, and an inductor connected in series, the values of the inductor, capacitor, and resistor in the series branch being proportioned with respect to L, C, and $\sqrt{L/C}$, respectively, to build out the impedance of the line terminated at full section to an approximately constant resistance over a band of frequencies extending from below $f_c/2$ to above $2f_c$, and the shunt branch being adapted to make the resistive component of the built-out impedance of the line more nearly constant in the frequency range below $f_c/2$.

7. An impedance-matching network for a loaded transmission line having series inductance L and shunt capacitance C per loading section, the network comprising a series impedance branch and a shunt impedance branch, the series branch including a first inductor in parallel with the series combination of a capacitor and a first resistor, the values of the inductor, capacitor, and resistor in the series branch being proportioned with respect to L, C, and $\sqrt{L/C}$, respectively, to build out the impedance of the line terminated at full section to an approximately constant, pure resistance over a wide band of frequencies extending both above and below the cut-off of the line, the shunt branch comprising only a second inductor and a second resistor, and the shunt branch being adapted to make the built-out impedance of the line more nearly a constant, pure resistance at very low frequencies.

References Cited in the file of this patent

UNITED STATES PATENTS

| | | |
|---|---|---|
| 2,629,819 | Dome | Feb. 24, 1953 |
| 2,874,220 | Cox | Feb. 17, 1959 |